May 31, 1966　　　E. J. JOHNSTON　　　3,253,393
RAKE TOOTH WITH RELEASABLE TINE CONSTRUCTION
Filed Oct. 8, 1964

Inventor:
Edward J. Johnston
By John J. Kowalik
Atty.

United States Patent Office 3,253,393
Patented May 31, 1966

3,253,393
RAKE TOOTH WITH RELEASABLE TINE CONSTRUCTION
Edward J. Johnston, La Grange, Ill., assignor to International Harvester Company, Chicago, Ill., a corporation of New Jersey
Filed Oct. 8, 1964, Ser. No. 402,429
3 Claims. (Cl. 56—400)

This invention relates to farm implements. Particularly it relates to rakes and the like. Specifically it relates to a rake tooth construction adapted for use in a side-delivery rake or equivalent implement.

A conventional rake comprises a rake bar on which there are mounted or to which there are connected a plurality of depending rake teeth comprising tines. A side-delivery rake is a device adapted to move hay and the like into windrows which are parallel to the path of movement of and to one side of a vehicle which carries and supports the rake bar. For that purpose, a rake bar is generally disposed at an angle from the perpendicular of the path of movement of the vehicle carrying the rake bar. Furthermore, it is continuously power driven by a rotary mechanism in an eliptical path into and out of engagement with crop which is being raked to side deliver or drive such crop into the windrows.

The rotary mechanism which drives a rake bar causes it to rise and fall in its path of movement to bring tines mounted thereon into repeated engagement with the ground. Furthermore, during a portion of the course of movement of a rake bar, the tines of necessity because of poor adjustment by the operator or uneven terrain, are drawn across ground surface. Accordingly, the rake teeth are subjected to wear resulting from erosion and jolting which occur in normal usage.

Conventionally, a rake tooth is individually releasably connected to a rake bar, whereby individual teeth may be replaced. For connection to a rake bar, the inner end portion of each tooth comprises a connector generally referred to as a clip. Conventionally, a clip may comprise a metal component which can be releasably bolted to a rake bar. A resilient block or body fabricated from rubber or other elastomer material, which may be bonded to the metal clip, itself forms a link between the inner end portion of a metal tine and the clip. A variation in conventional mountings for a rake tooth is provided by a clip in which a rubber or elastomer block is removably carried, with the inner end portion of a tine rigidly secured or bonded in the block.

It is apparent from the foregoing that when only a portion of a conventional rake tooth is damaged, more than merely the damaged portion will require replacement. Employing one conventional construction, an entire clip and block together with its tine will require replacement. Employing another, the rubber or elastomer block together with its tine will require replacement. In any regard, when employing prior devices, should replacement of a tine be indicated by reason of wear or damage to an outer end portion of such tine, the entire tine together with either its whole or a portion of its mounting or linkage to the rake bar must be replaced, notwithstanding that the mounting is in good repair.

Accordingly, it is a primary object of the instant invention to provide an improved rake tooth construction.

It is an additional object of the instant invention to provide a rake tooth construction having means for connecting the rake tooth to the rake bar, a tine carried by said tooth and novel means for releasably securing said tine in said tooth.

A yet further object of the instant invention is the provision of a rake tooth which includes a clip or connector releasably mountable upon a rake bar and having a resilient portion in which there is securely anchored a permanent tine receiving member and improved means for releasably securing a tine in said tooth.

The foregoing and other objects, features and advantages of the present invention will become more apparent upon consideration of the following description and appended claims, when considered in conjunction with the accompanying drawings, wherein the same reference character or numeral refers to like or corresponding parts throughout the several views.

On the drawings:
FIG. 1 is a vertical sectional view through a rake bar and rake tooth embodying one form of the invention and showing a replaceable tine in elevation, with a tine section broken out to conserve drawing area.

Figure 1:
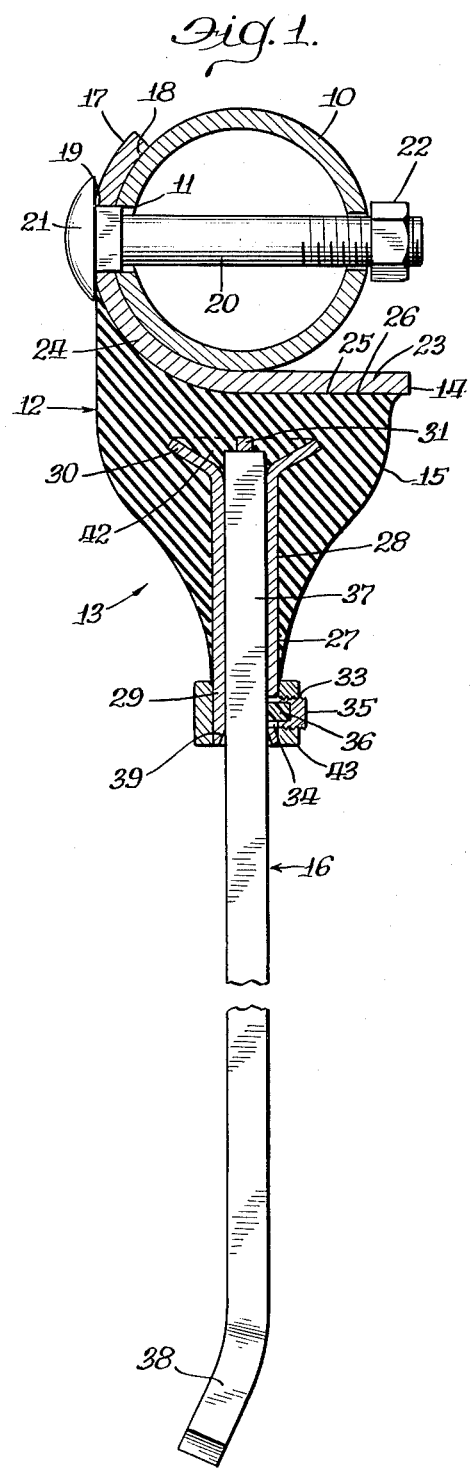
Figure 2:
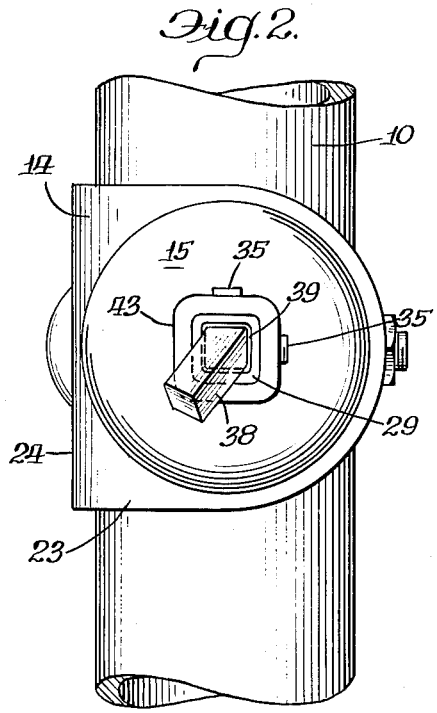
FIG. 2 is a view looking upwardly from the bottom of FIG. 1 at a section of the rake bar.

Referring more particularly to the drawings, an elongated rake bar 10 is shown in FIGS. 1 and 2. The rake bar 10 may be fabricated from a conventional metal and of circular tubular construction in accordance with practice well known to those in the art. The rake bar 10 has provided in the wall thereof a pair of apertures 11 which are disposed in diametrically opposed positions. The rake bar 10 has secured thereto a plurality of like rake teeth generally designated by the numeral 13. Only one of said teeth 13 is shown in the drawings and will be described hereinafter with greater particularity. The construction of the remainder of the rake teeth is substantially the same as that shown in the drawings, and they depend from the rake bar 10 in longitudinally spaced apart positions.

To facilitate description of the invention, terms having currency in the art will be used herein. However, as used in this description, "tooth" and "tine" are distinguished. "Tooth" is used to define generally that entire structure 13 which is releasably secured to the rake bar 10. On the other hand, "tine" is used to define that elongated metal component 16 which depends from the rake bar 10 and comprises a portion of the "tooth." Restated, the "tine" is a part of the "tooth," and "tine" and "tooth" are not used synonymously.

The rake tooth 13 comprises a connector, generally designated by numeral 12, and the tine 16, mounted in said connector 12. The connector 12 comprises a clip, generally designated by the numeral 14, and a yieldable or flexible block or body 15.

The clip 14 may be fabricated of metal conventional in the art. In the embodiment herein disclosed, the clip 14 is J-shaped and disposed 90° from normal "J" position. The clip 14 comprises an upper or side curved or arcuate portion or leg 17 the inner surface 18 of which is concave with a radius equal to the external radius of rake bar 10 whereby the upper leg 17 of the clip 14 can be fit snugly against the outer surface of the rake bar 10. The upper leg 17 is apertured as at 19 to provide a passage for a bolt 20 which extends through the aperture 19 and the aperture 11 which are aligned with the aperture 19. The head 21 of the bolt 20 bears against the outer surface of the upper leg 17, and a nut 22 is releasably mounted on the end of the bolt 20. Thereby, releasable securance of the clip 14 and the rake bar 10 is achieved.

The clip 14 also comprises a lower straight portion or leg 23 which is lobate in shape, as illustrated in FIG. 2, and an integral intermediate portion 24 which is curved and at opposite ends is integral with the upper curved leg 17 and the lower straight leg 23.

A continuous lower surface area 25 of the intermediate portion 24 and the lower portion 23 is bonded or molded by vulcanizing or the like onto the upper curved surface 26 of the block or body 15, as illustrated in FIG. 1. The block or body 15 is fabricated from rubber or equivalent elastomer material, and in cross section the periphery of said block 15 presents a circle. From its upper surface 26, the block 15 extends downwardly and may be tapered inwardly, as illustrated in FIG. 1. When viewed from the exterior, the shape of the block 15 might be considered somewhat like an inverted bell housing or dome.

There is provided in the body 15 a centrally disposed hole, inverted well or cavity 27 opening downwardly to the outside and extending vertically inwardly about a longitudinal axis preferably perpendicular to the axis of the bolt 20. The well or cavity 27 may extend from the bottom of the block 15 to about the upper fourth of said block, as illustrated in FIG. 1.

Figure 3:
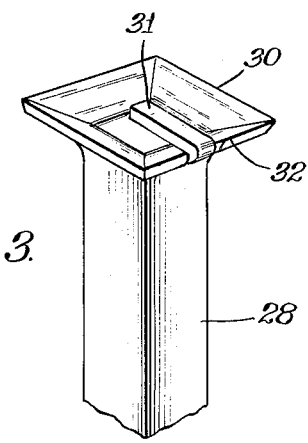
FIG. 3 is a perspective view of the upper end portion of the tine receiving or mounting member.

A tube-like structure or tine receiving or mounting member 28 is disposed and secured in said well or cavity 27. The tine mounting member 28 is preferably of metal fabrication. In the embodiment illustrated, said tine mounting member 28 is rectangular in cross section. A lower end portion 29 of said tube extends downwardly and outwardly from the block 15, as illustrated in FIG. 1. The upper end portion of said tube provides an anchor 30 which is permanently embedded in the body of the fabric of block 15. The anchor 30 may be formed by flaring the top of the tube 28, as illustrated in FIG. 3. The entire tube 28, except for that portion of the bottom 29 which extends outwardly from the body 15, is sealed or bonded to the fabric of said body by any means well known in the art.

In the embodiment illustrated, a boss, lug or stop 31 is struck inwardly from the upper lip 32 of anchor or flared portion 30, and said lug or boss 31 extends over the opening 42 which is formed in the tube 28. The lug, boss or stop 31 acts to limit the inward movement of the tine 16 when the same is being mounted.

A collar 43 is mounted on and disposed about the lower end portion 29 of the tube 28. The collar 43 has a pair of internally threaded apertures 33 which are inwardly threaded and disposed at right angles to each other. The apertures 33 are diametrically disposed, and each of said apertures 33 is aligned with a corresponding aperture 34, only one of which is shown in FIG. 1. Apertures 34 extend diametrically through the lower end portion 29 of the sleeve or tube 28. A set screw 35 is mounted in each of the apertures 33, the disposition of said set screws being illustrated in FIG. 2. As illustrated in FIGS. 1 and 2, each set screw is threadable through a respective aperture 34 to bear against the tine 16 from two directions perpendicular to each other.

As illustrated in FIG. 1, which shows in section the details of construction of only one of the set screws, a bearing portion 36 comprises a plastic member the outer end portion of which is secured in the body of its respective screw 35 and the inner end portion of which bears against the replaceable tine 16.

The tine 16 is removably mounted, and to that end has an elongated body the upper end portion 37 of which is slidably and releasably mounted in the tube or tine mounting member 28. The inward movement of the replaceable tine 16 is limited by engagement thereof with the boss or stop 31. The lower end portion 38 of the tine is angularly bent in accordance with conventional practice for side-delivery of crop, grass or hay into rows, as heretofore described. The tine 16 is of suitable metallic fabrication, and as illustrated in FIGS. 1 and 2 the tine 16 may be of rectangular cross section. Such configuration will permit the tine to slide in and out of the rectangular tube 28 and locks said tine 16 from independent rotation with respect to the body or block 15.

In operation the plastic tips of the set screws bear against two of the flat surfaces of the tine 16 to rigidly hold the same when said set screws are tightened. To release the tine 16, the set screws are loosened and slightly withdrawn to permit the tine to be withdrawn from tine mount member 28. To facilitate easy tine 16 insertion into tine mounting member 28, the inner surface of the lower end of tube structure is outwardly beveled as at 39.

The foregoing construction of course provides a rake tooth with a replaceable tine in which the clip 14 and the block 15 are usable with successive tines; that is to say, as successive tines wear by reason of erosion from repeated contact with soil and the like, or breakage, the tines may be replaced while the remainder of the tooth is retained. Thereby, substantial economies are available which heretofore have not been possible using conventional devices in which an entire tooth would require replacement were merely a tine rendered useless.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A rake tooth construction comprising a connector member adapted to be releasably secured to a rake bar; an elastomer body bonded to said connector member; a tube-like tine mounting member having an inner end portion secured in said body; a tine having an inner end portion releasably mounted in said tine mounting member, and a boss disposed adjacent the inner end of said tine mounting member to limit the inward movement of said tine, said boss being struck from the inner end portion of said tine mounting member.

2. A rake tooth construction comprising a connector member adapted to be releasably secured to a rake bar; an elastomer body bonded to said connector member; a tube-like tine mounting member anchored in said body; an elongated tine releasably secured in said body, an end portion of said tine extending outwardly from said body, and means for releasably retaining said tine in said mounting member, said means for releasably retaining said tine in said tine mounting member being further characterized by an outer end portion of said tine mounting member extending outwardly from said body, and a collar disposed about said outer end portion and having therein mounted said set screw.

3. The device defined in claim 2 in which said set screw is characterized by a plastic bearing mounted in the inner end portion thereof and releasably bearing against said tine.

References Cited by the Examiner
UNITED STATES PATENTS

| | | | |
|---|---|---|---|
| 2,054,129 | 9/1936 | Kelsey | 172—96 |
| 2,583,767 | 1/1952 | Daignas. | |
| 3,157,019 | 11/1964 | Brackbill | 54—400 |

ABRAHAM G. STONE, *Primary Examiner.*

RUSSELL R. KINSEY, *Examiner.*

M. C. PAYDEN, *Assistant Examiner.*